United States Patent [19]
Lander et al.

[11] Patent Number: 5,984,880
[45] Date of Patent: Nov. 16, 1999

[54] TACTILE FEEDBACK CONTROLLED BY VARIOUS MEDIUM

[76] Inventors: Ralph H Lander, 1West 85th Montage; Seth Haberman, 1West 85th, Apt. 6A, both of New York, N.Y. 10024

[21] Appl. No.: 09/009,555

[22] Filed: Jan. 20, 1998

[51] Int. Cl.⁶ ........................................... A61B 5/03
[52] U.S. Cl. ............................................. 600/595
[58] Field of Search ..................... 600/552, 553, 600/554, 555, 587, 595

[56] References Cited

U.S. PATENT DOCUMENTS

| | | | |
|---|---|---|---|
| 5,165,897 | 11/1992 | Johnson | 434/113 |
| 5,429,140 | 7/1995 | Burdea et al. | 600/587 |
| 5,709,219 | 1/1998 | Chen et al. | 600/595 |

*Primary Examiner*—Max Hindenburg

[57] ABSTRACT

Control over tactile feedback devices, force-feedback devices, or a combination thereof comprising: processing device (54 and 53), processing device (54); networking means (55) such as an Internet means, television communications, and satellite communications. Tactile output system selects pre-recorded material (63) in response to sensor input. Biofeedback sensors (13) supply tactile/force-feedback system with additional information. Dermatologically compatible material (50) for combining with tactile feedback devices and force-feedback devices.

20 Claims, 7 Drawing Sheets

TACTILE FEEDBACK CONTROLLED BY VARIOUS MEDIUM

FIELD OF THE INVENTION

This invention is in the field of robotic devices for monitoring and controlling the movement of human limbs and body joints, and mechanical members.

BACKGROUND OF THE INVENTION

Over the past 50 years, the technology associated with robotic apparatus has grown dramatically. In the early 1940's, the field of technology for robotic apparatus was significantly advanced during the development of atomic weapons. At that time, it was necessary to develop robotic tools, such as robotic hands that could be operated remotely, a safe distance from radioactive substances being transferred from one vessel to another. A new generation of more flexible force-feedback devices now called Haptic devices have been introduced into a variety of old and new markets, for example: the video, computer, and arcade game industry is starting a whole new line of products based on Haptics. New portable computer keyboards and computer mice have full tactile capabilities. Vehicles manufacturers finding ways to putting the drivers and pilots back in touch with their vehicles. Haptic devices are used in the medical field, for remote surgery systems, the training of surgeons, and the use in physical therapy apparatus, such as exercise machines, and so forth.

Robotics is already used extensively in the entertainment industry, for applications ranging from unusual visual effects for movies, to apparatus associated with virtual reality systems.

It has become increasingly apparent that the Internet may be the next frontier of Haptics devices, allowing users at opposite ends to interact with each other through touch and feel.

The present inventor recognized the need for HAPTIC devices to enhance visual and audio information.

In virtual reality systems it is important to know how a user has moved their limbs in response to certain stimuli, in order to feedback appropriate images, stimulus, and perhaps forced movement of limbs, in response to signals associated with the monitored activity of the user's body. In Internet applications this philosophy has been taken a step further. Besides knowing how one user has moved his limbs, it is as important to know how a second user responds to such stimulation. For example, a father or mother away from home through work can get in touch with their three year old daughter through the world wide web by placing their hand onto a pressure sensitive pad. This pad sends the pressure signals to a second pad used by their daughter who can feel the touch of her parents and vice versa while they communicate with each other over the phone. Other variations of such devices can be implemented involving various body limbs such as to accommodate various disabilities, applications and industries.

SUMMARY OF THE INVENTION

In accordance with this invention for monitoring and controlling movement of human limbs, and mechanical members, mechanical devices are provided that are moved in response to the calculations of a computing device, and the actual movement of such a device is monitored by absolute or relative optical encoders that provide electrical signals indicative of that movement. Such a mechanical HAPTIC device can comprise of electro-magnetic, hydraulic, or any other suitable means of force-feedback.

Other tactile output devices are provided. These tactile output devices could be of vibrating output, electro magnetic output, temperature changing output, etc.

Materials are provided so that they can simulate organic material, as, for example, to simulate the texture and density of the skin and flesh of a human hand. Together these components can create realistic looking, operating, and feeling body parts.

Bio-feedback sensors are provided so that they can supply the system with more user interactive information.

Pre-recorded material can provide with interactive platform such as from A DVD player.

A regulating device is provided such as to process the control device 3 signal into an understandable signal for the tactile output device 8. This regulating device could be of analog or digital means. This regulating device 7 could be a desktop computer digitally computing the particular input and output values. This regulating device could be connected to a network allowing it to communicate with other computing devices.

Alternatively, multiple computers could provide with communication platform for multiple HAPTIC devices, over the Internet or any other suitable network allowing these devices and their users to interact with each other.

BRIEF DESCRIPTION OF THE DRAWINGS

Various embodiments of the present invention are described below with reference to the drawings, in which like items are identified by the same reference designation, and in which.

DETAILED DESCRIPTION OF THE INVENTION

FIG. 1A, 1B, 1C, 1D Here is shown a front, top, side and perspective view of a human tongue for providing realistic looks, functionality, and feel constructed in accordance with the teachings of the present invention.

The system includes a first a force-feedback assembly 1/15 comprising a force source 1 supplying the tongue with a variable force value and a sensor which monitors the tongue movement. The system also includes flexible material 50 placed around the force-feedback assembly 1 such as to follow force-feedback assembly 1 directions. Supports 1b are attached to each force-feedback assembly 1/15 link to provide with more support for material 50. Material 50 is fit to force-feedback assembly 1 and support 1b snugly. Its material simulating realistic shape, surface texture, movement and feel of a human tongue.

Figure 1:
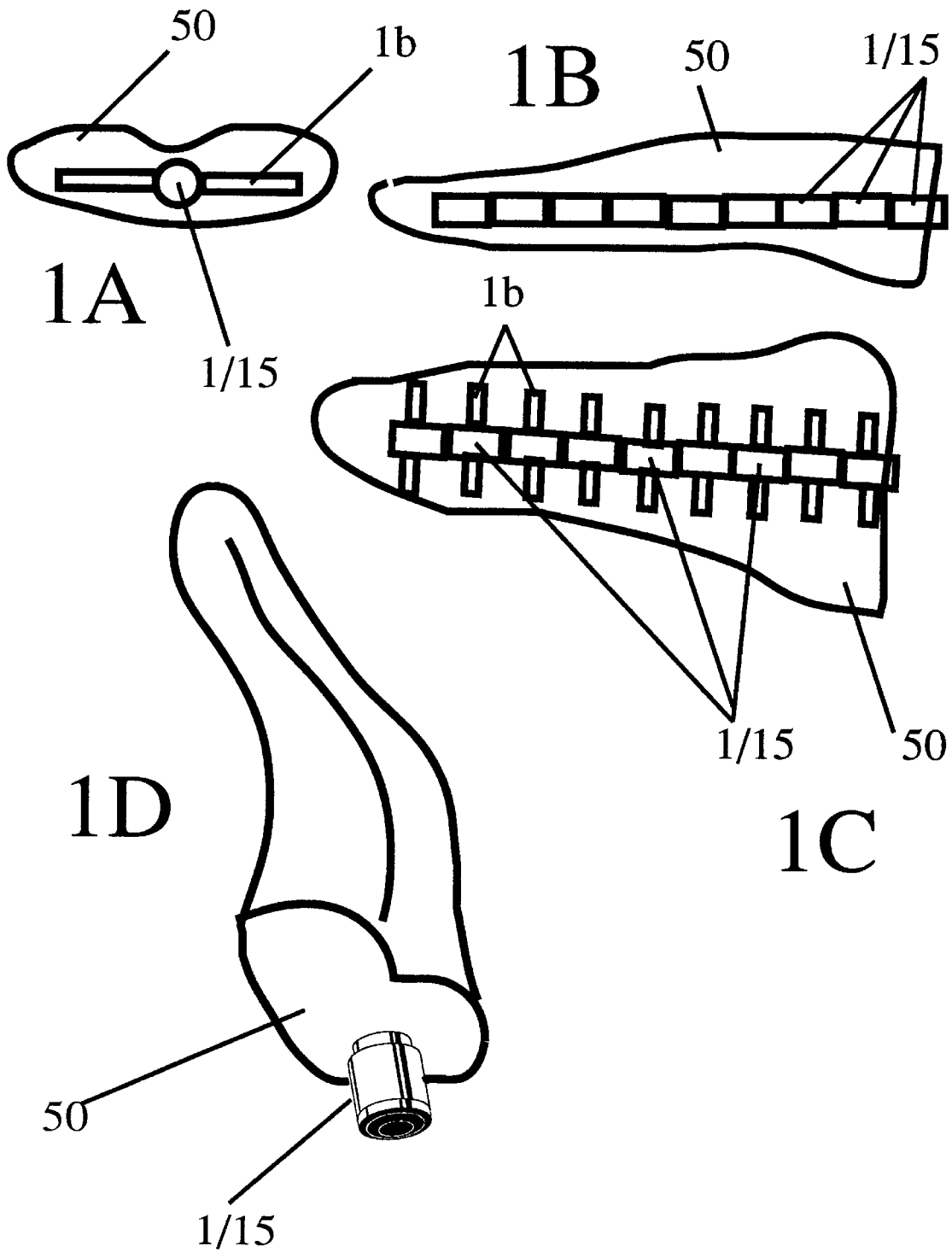
FIGS. 1A, 1B, 1C are sectional views of a force sensing and force interactive human tongue.
FIG. 1D is a perspective view for a force sensing and force interactive human tongue.
Figure 2:
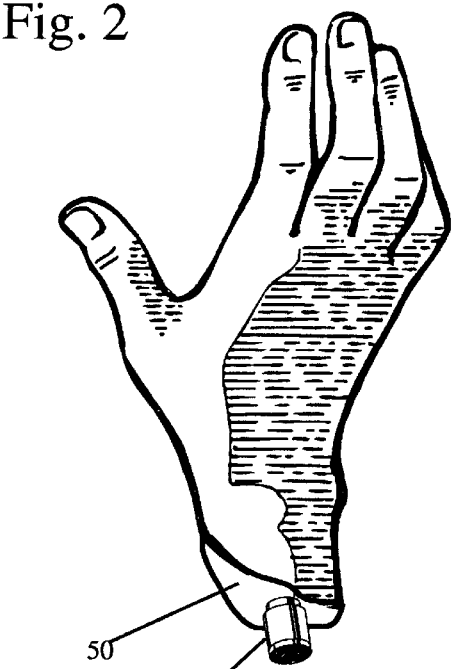
FIG. 2 illustrates a force sensing and force interactive human hand.

FIG. 2 Here is shown a perspective view of a human hand for providing realistic looks, functionality, and feel constructed in accordance with the teachings of the present invention.

The system includes a first a force-feedback assembly 1/15 comprising a force source 1 supplying the hand with a variable force value and a sensor 15 which monitors the hand movement. The system also includes flexible material 50 placed around the force-feedback assembly 1 such as to follow force-feedback assembly 1 directions. Material 50 is fit to force-feedback assembly 1 snugly. Its material simulating realistic shape, surface texture, movement and feel of a human hand.

From here on, the term artificial limb describes any device, that is Dermatologically compatible with a users skin, and includes tactile 5 functionality.

Figure 3:
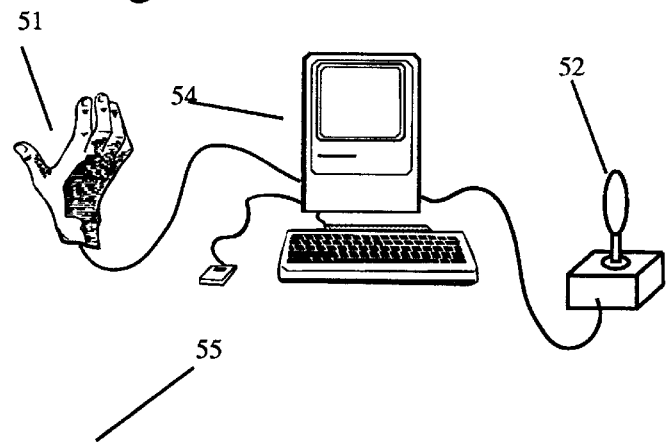
FIG. 3 illustrates a way of communication of two Haptics devices.

FIG. 3 Here is shown a diagram of an interactive system using a force-feedback device to interact with an artificial limb for providing realistic and interactive functionality, and feel constructed in accordance with the teachings of the present invention. The system includes a first a force-feedback device 51 supplying the computer 54 with a variable position value.

The system also includes an artificial limb 52 supplying the computer 54 with a variable position value.

The artificial limb 52 can be connected to the computer 54 to translate a positional value to the computer 54 while the force-feedback device 51 accomplishes a particular function. The force-feedback device 51 is connected to the computer 54 to translate a positional values to the computer 54 while the artificial limb 52 accomplishes a particular function. The computer 54 connects the force-feedback device 51 and the artificial limb 52 to translate positional values and for storage of data and programming used in the operation of the force-feedback device 51 and the artificial limb 52. Separate position values are communicated to the computer 54, thus allowing the computer 54 to monitor respective position of the force-feedback device and the artificial limb. The respective devices 51 and 52 are being adjusted by the computer 54 such that the artificial limb 51 is driven to the particular position and at the same time the force-feedback device 52 generates a particular feedback value at particular position. Alternatively, the respective devices 51 and 52 are being adjusted by the computer 54 such that the force-feedback device 52 is driven to the particular position and at the same time the artificial limb 51 generates a particular feedback value at particular position. The computer monitors and controls the feedback pattern developed by the force-feedback device 52, and the feedback force developed by the particular artificial limb 51.

The force-feedback device 52 and the artificial limb 51 are connected such that the user can feel the force, the artificial limb 51 encounters, at the force-feedback device 52. Alternatively, the force-feedback device 52 and the artificial limb 51 are connected such that the user can feel the force, the force-feedback device 52 encounters, at the artificial limb 51.

A digital word may be fed to the devices 51 and 52 by the computer 54 in some cases, thus producing an exact ratio of feedback between the force of the device 51 and the force of device 52 depended upon the position constant of the force-feedback device 52 and the position constant of the artificial limb 51.

Usually the force of the force-feedback device 52 and the feedback of artificial limb 51 will be varied as a function of system forces, user interactive forces, virtual environment objects or a selected blend of these including computer 54 output. These variations are being controlled by the computer 54 achieving, for human sensors, continuos force-feedback to the artificial limb 51 and force-feedback to the force-feedback device 52 and thereby complete sensory tactile feedback to at lest one user.

On a precisely timed, periodic basis, the computer 54 reads booth, the device 51 and device 52, position information and the new value is subtracted from the old value to determine if there is a difference of the two. If there is any significant difference between the previous and new values the computer 54 outputs a signal to the device 52 and 51 of a polarity such that if, for example, the artificial limb 51 is held stationary the force-feedback device 52 will be commanded to minimize the position error. The system of the present invention is particularly adapted for two human beings to interact with each other by touch.

Each of the memory systems shown in FIG. 3 requires at least two position changing mediums and position encoder sensors, and at least one computing device. Such a position changing medium, encoder and computer assembly for booth the position changing mediums and the personal computer are shown in FIG. 3.

Figure 4:
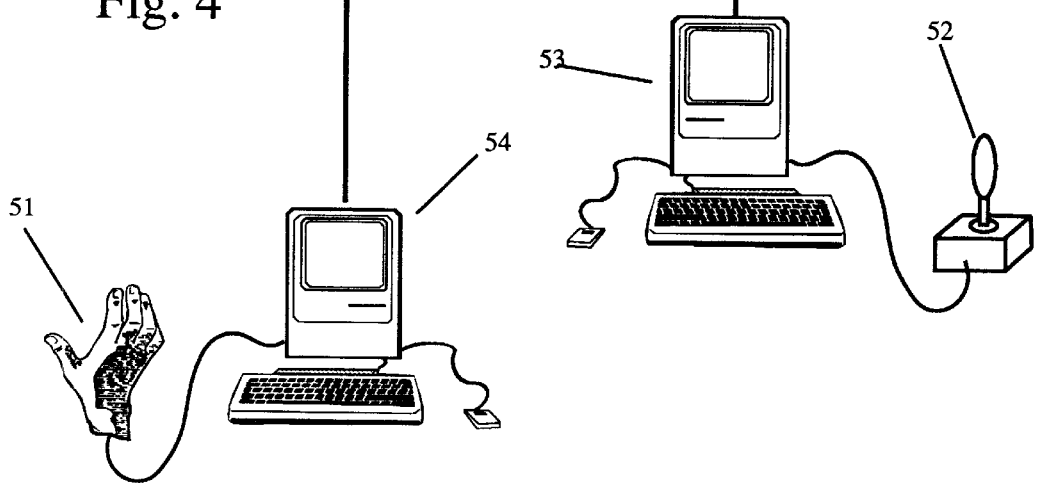
FIG. 4 illustrates a way of communication of two Haptics devices over the Internet.

FIG. 4. Here is shown an illustration of two tactile output devices and or two force-feedback devices to be controlled through a network.

This system includes two computers 54/53 connected by a network 55, comprising of a command computer 54 which communicates its commands to an executing computer 53. Executing computer 53 then communicates the command signal to the tactile output device and or force-feedback device. Each computer includes audio and visual capabilities allowing the users of the computers to communicate via visual and audio medium as well.

Although the previously described systems in FIG. 1–4 are illustrated as using single limbs of motion or feedback, it should clearly understood that with proper gimballing and multiple force/tactile feedback generation medium and processor units, multiple limbs are readily configured using combinations and multiples of the systems described in FIG. 1–4.

Figure 5:
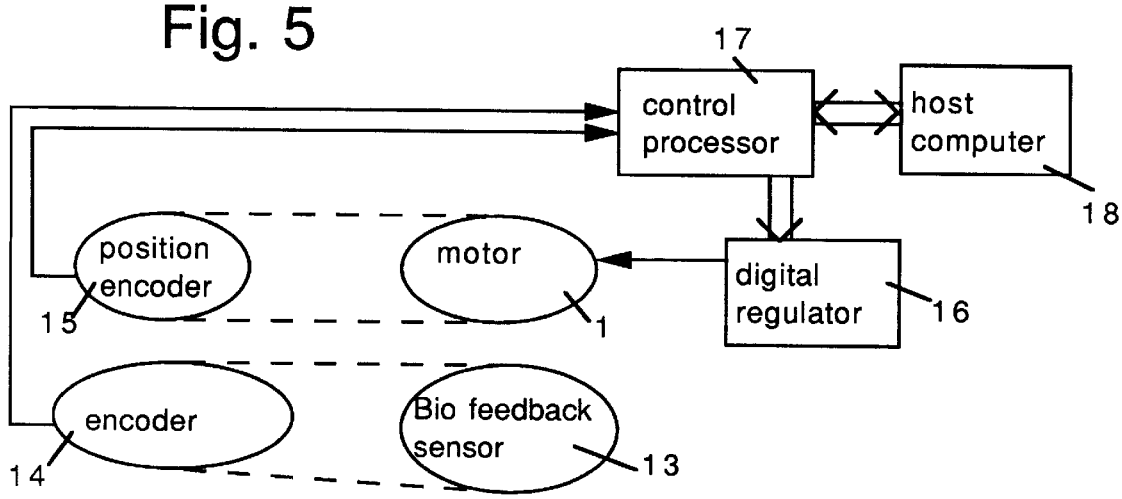
FIG. 5 Here is shown block diagram of an electric motor using a force and/or biofeedback sensor for providing tactile feedback information.

FIG. 5 Here is shown block diagram of an electric motor using a force and/or biofeedback sensor for providing force magnitude information to a torque control apparatus constructed in accordance with the teachings of the present invention.

The system includes a first sensor/encoder means 13/14 comprising a sensor 13 and a encoder 14 which monitors the forces developed at the motion follow mechanism and/or the biofeedback information from the user. The system includes a motor/encoder assembly 1/15 comprising a motor 1 supplying the system with force-feedback and a encoder 15 which monitors the shaft position. The sensor 13 is connected to the mechanism to be attached close to the motion follow mechanism joint and monitors the system forces.

Altrenatively, a bio-feedback sensor 13 is attached at the user and monitors the user.

The motor 1 shaft is connected to the motion follow mechanism, providing a force of resistance for the user to develop force-feedback indicative to the level of selected forces developed while operating the motion follow mechanism shaft 47. The motor 1 is connected to a digital regulator 16, which is capable of either setting a precise value of current or voltage to the motor. In the event that the motor 1 is acting as a generator rather then a motor, the regulator has the ability of sinking as well as sourcing current. In this embodiment the motor 1 is programmed to engage if force sensor encoder, biofeedback sensor, or shaft rotation encoder signals particular conditions such as: a) exceeding a particular force magnitude value. b) reaching a particular shaft position value. c) reaching a particular biofeedback level. d) a, b and c combined. The magnitude encoder 14 and the motor shaft encoder 15 output is connected to decoding logic. This decoding logic might be incorporated in a integrated circuit or could be composed of discrete logic gates using logic design techniques well known to those skilled in the art. The decoding logic output then goes to the processor 17. The processor 17 may also be connected to a host computer 18 for storage of data and programming used in the operation of the processor 17. The processor 17 is connected to and digitally controls the programmable regulators of the motor as to precisely regulate the polarity, current or voltage.

The system of the present invention utilizes one motor 1 having position encoder 15. The system also includes a force sensor 13 having a magnitude encoder 14.

The shaft rotation and force sensor 13 encoder blocks 15 and 14 are connected to the processor 17. Each encoder block is periodically selected and interrogated for position, biofeedback and force information. Each encoder block has counter, direction and counter, force magnitude encoder circuitry for monitoring its respective direction of rotation, angular position, force magnitude of the motion follow mechanism (not shown, and biofeedback input. Each encoder block has separate encoder circuitry for monitoring its respective direction of rotation, angular position and its respective magnitude of force. The processor 17 is also connected by a common bus to the digitally controlled motor 1 regulator 16. The current or voltage output by the respective regulator 16 is adjusted by the microprocessor 17 such that the motor 1 is driven to the particular position according to the information of the encoder 14 and the shaft rotation encoder 15 such that system operation supplies the user with the needed force-feedback. The feedback force developed by motor 1 is initialized precisely by the regulator 16, if the information supplied to the sensor 13 supplies the system with the particular user interaction. The feedback force developed by motor 1 is maintained precisely by the regulator 16, if the information supplied by the sensor 13 supplies the system with the particular user or motion follow mechanism interaction. The motor 1 is connected by mechanical means to the motion follow mechanism which intends to attach to the user. The sensor 13 may or may not be located near the motor 1. These physical connections may vary depending upon the particular application, such that the user can hand rotate the shaft 1 and feel the feedback as the processor of the motion follow mechanism is being in effect.

In some cases a digital word may be fed to the motor 1 and regulator 16 by the processor 17, thus producing an exact ratio between the force, speed and direction of rotation of the motor 1 shaft and the force magnitude information of the force sensor. Usually the torque of the motor 1 will be varied as a function of the user force calculations (force by the user applied to the shaft 1 [as explained in FIG. 6] ), sensor 13 information, and a selected blend of information including host computer, DVD, CD-ROM, tape, etc. output 18. Such variation being controlled by the processor 17 in order to achieve system force feedback to the shaft 1 and thereby to the user. The force and shaft position information from booth the encoders 14 and 15 are periodically read by the processor 17 and each value is compared to determine if there is a difference to the predefined (the encoder and motor shaft encoder values that are predetermined and recorded in a look up table stored in the system) values. This is done on a precisely timed, periodic basis. Whenever any significant difference occurs between the two values the micro processor outputs a signal to the motor 1 of a polarity such that if the encoder 14 or one of the motor encoder 15 values are held stationary the motor will be moved to minimize the user limb force and position error.

The time and magnitude value of the polarity, current or voltage fed to the motor 1 is proportional to the timed error between the motor encoder 15 and encoder 14 count. The above mentioned time interval is quite long compared to the clock cycle of the processor, allowing the processor to determine and set the position of the motor 1 shaft before the time period elapses. Usually, in the wait time before this timed event occurs, the processor 17 calculates the system forces developed while operating the system and sets the position of the motor 1 shaft such that the user feels the selected forces at the shaft 47. The calculation and setting of motor 1 shaft position takes second priority over user force and biofeedback, system force calculations and host computer information exchange and is interrupted when the time interval flag is set. Thus the user force and biofeedback calculations, the force information and host computer information is set every time increment, but more then one time increment is needed to set motor 1 torque.

The update time of the microprocessor 17, as compared to a human user response time, is such that the user feels a virtually continues tactile feedback force applied to the motion follow mechanism by the motor 1 which is directly indicative of the selected forces developed while operating the system.

The processor 17 is also connected to the host computer, DVD, CD-ROM, tape, etc. player 18 (any suitable computer system may be used) which is connected to interface with the processor 17. The force information imparted to or initialized by the user and the system usually is also output to the host computer 18. This information may be used for force profile storage purposes or for a CRT visual, audio and other tactile feedback indicative of the forces applied to, imposed by the user or booth.

The system of the present invention is particularly adapted for utilizing a human operator to dynamically weight the user interaction, prerecorded material output, and system forces while being manipulated.

Each of the memory systems shown in FIG. 5 requires one motor and angular position encoder, one force magnitude sensor and force magnitude encoder, one biofeedback magnitude sensor and biofeedback magnitude encoder, as well as a digitally programmable regulator. Such a motor, sensor and encoder assembly for the motor 1, the biofeedback sensor and the force sensor 13 are shown in FIG. 5.

Figure 6:
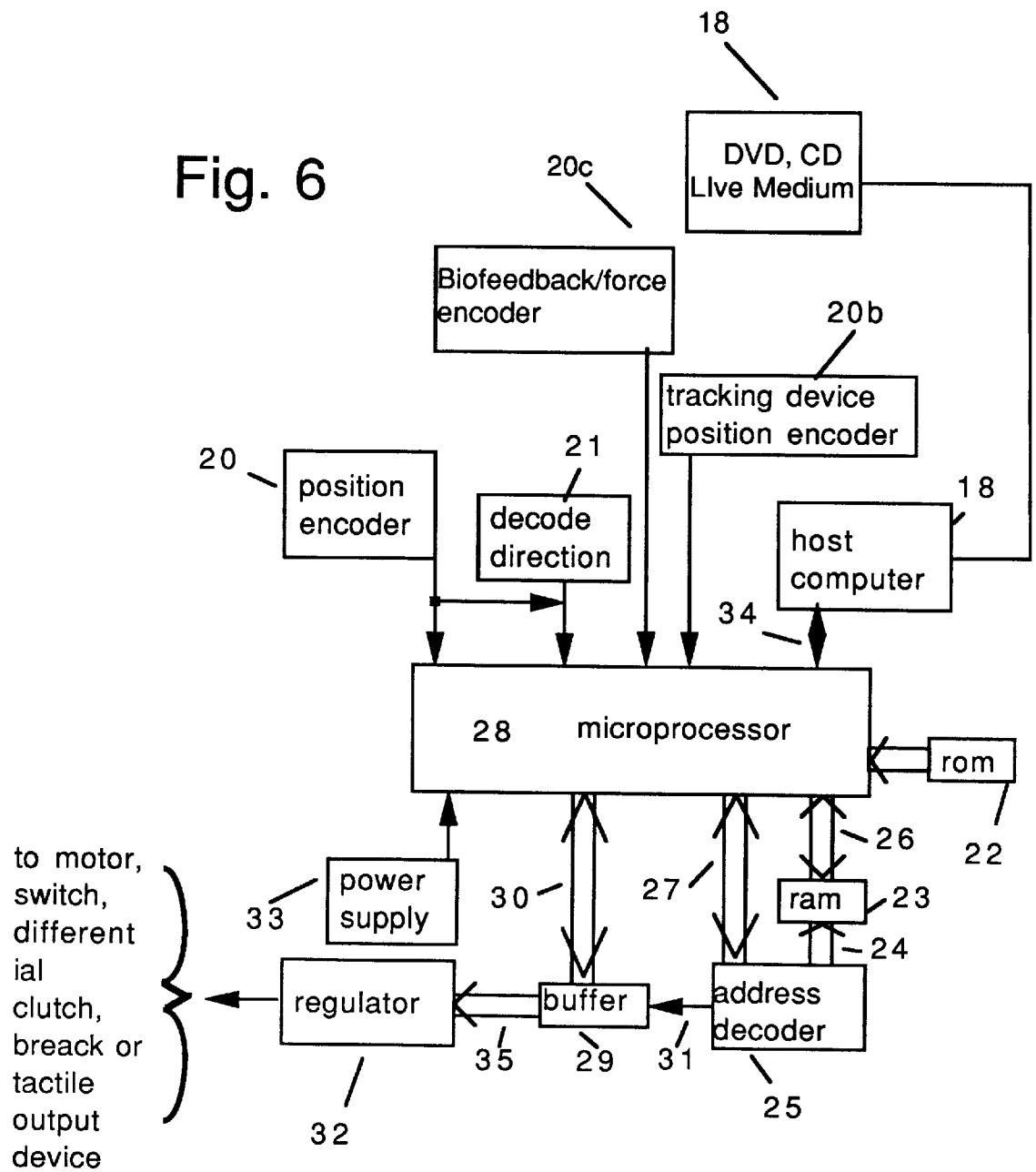
FIG. 6 Here is shown a block diagram of the microprocessor controlled elements for providing tactile feedback to a user.

A processor, host computer and other common equipment may be shared by the subsystem for each shaft. In applications where very high throughput is needed, two processors might operate in parallel, one setting user force and motion follow information, while the other sets motor torque. The regulator 16 controlling a motor 1 could instead be controlling a clutch, a differential, a switch, or any other force manipulating device.

processor control:

FIG. 6 Here is shown a block diagram of the microprocessor controlled elements for providing tactile feedback to a user constructed in accordance with the teachings of the present invention. The system includes a first a microprocessor chip 28, (comprising of any currently available digital processing devices) which controls the system. A direction encoding logic 21 is included which communicates shaft rotation direction information to the microprocessor. Also a displacement decoding logic 20 is included which communicates angular shaft rotation information to the microprocessor. Alternatively, other position decoding logic 20b can be included which communicates device position (using trackers such as a Oscilloscope, the Spasyn system and triangulation techniques using, Infra-red or Ultrasonic source and sensors) information to the microprocessor. And magnitude decoding logic 20c is included which monitors the force applied to the motion follow mechanism and/or the biofeedback output of a user. Multiple tristate buffer logic is included which communicates its contents to the digitally controlled register 32. A ROM memory 22 is available which contains information such as to sequence the microprocessor. Similar a RAM memory 23 is available which is able to both store and recall processing information. And at least one-5 volt generating chip is included such as to power Universal Asynchronous Receiver/Transmitter (UART). These components of the processor control circuitry of FIG. 6 can be divided into multiple functional elements, specific to configuration and operation. Some of the other elements shown as a separate components of the block diagram in FIG. 6 may be included into such a processor, or multiple elements including the processor could comprise of one processing system such as host computer, a processing card, etc. depending onto the processing device that is used. To implement the system of the present invention these elements may be included as separate components.

Preprogrammed control data for the microprocessor 28 is provided by a read-only memory (ROM) 22 unit. Data stored in the ROM memory 22 sequences the processor 28 (as further discussed bellow), to either receive position encoder data from unit 20, 20b, decoder direction data from unit 21, and force and/or biofeedback magnitude information from unit 20c, and also to perform calculations thereon in order to determine either the position of a switch, the displacement, velocity, or acceleration of the motor, the constant differential and/or clutch output shaft as well as the resistance of a breaking device at periodic intervals. These calculations can also be used to determine the output magnitude, displacement and pattern of a tactile stimulation device. Similarly, to both store and recall processing information a random access memory (RAM) 23 is available to the microprocessor 28 through bus 24. An address decoder 25 is connected to the microprocessor 28 through a bus 27 and to the RAM 23 through a bus 18. A buffer memory register 29 is connected to the address decoder via data line 31 and to the processor 28 through a bus 30. Buffer 29 contents are via a bus 35 communicated to the digitally controlled register 32. Current flow through, or voltage applied to the motor is precisely controlled by a regulator. The same or a different regulator precisely controls current flow through, or voltage applied to a constant differential, clutch, switch, and/or break mechanism as well. Furtherin, the same or a different regulator precisely controls current flow through, or voltage applied to a transducer or any other tactile output device (such as vibrating membranes, heat generators, static field generators, etc.). A selected tristate which is connected to the programmable current source 32 is actuated by the address decoding logic 25.

A position encoder data unit 20 and 20b, direction decoding unit 21, and magnitude decoding logic 20c are connected to the microprocessor 28 to transmit angular position displacement, angular direction data, triangular and other position displacement and magnitude information to the microprocessor. In accordance with calculations based upon the position and force encoder and time data or in accordance with programmed instructions, a digital number is selected by the processor 28, and supplied in through buffer 29 and bus 35 to the digitally controlled regulator 32. A precise value of voltage or current is defined by this digital number which will be set by the programmable regulator 32, and thus establish a precise selected value of torque, disposition and/or resistance to be placed on the output shaft of the motor/switch/differential/clutch and/or the break. As well as to establish a precise selected value of vibration, static's, temperature, etc. to the membrane of a transducer, generator, or any other tactile output device.

A counter is set by the shaft direction decoding circuitry 21, to count up or down, depending upon the direction of the shaft rotation determined by the direction decoding logic 21. Similar, a counter is set by the tracking device position decoding circuitry 20b, to provide with particular value, depending upon the position of the motion follow device determined by the position decoding logic 21. Also a counter is set by the force magnitude decoding circuitry, depending upon the force developed by the motion follow device determined by the decoding logic 20c. The microprocessor 28 reads and stores the counter accumulated pulses from shaft and tracking device displacement decoding logic 20 and 20b, input sensor (Bio feedback, temperature, brainwave, body moisture, etc.)decoding logic 20C and values in the counter at periodical basis in the stack registers of memory. In some instances the counter will be set to zero or some preselected number by all external signal to provide an absolute shaft distance, system force and/or device position reference. The angular shaft, device position and force data is read from the encoder counter 20, 20b and 20c and the current/voltage data is read to the regulator 32 to set the torque, disposition and/or resistance developed by the motor, switch, differential, clutch or break.

To receive serial data through the UART from the host computer 18, the microprocessor 28 is bootstrapt at start up by data stored in the ROM memory 22. These data are input via a direct memory access function of the microprocessor to the RAM memory 23 connected to the microprocessor 28. The microprocessor 28 may be polled through the UART at selected times, such as to send data from and to the host processor 18. The host computer and the microprocessor 28 are usually in constant communication via a communication port which may include any conventional communication module such as ethernet, fiber channel, Rs 422 interface, etc. A separate power supply 33 provides power for the communication module interface. This power unit may or may not be included into a microprocessor depending onto the particular microprocessor implemented. In general, the microprocessor 28 and the host computer 18 are in constant communication via some type of interface to provide a operator communications link as well as to receive program instructions.

The microprocessor 28 and pre-recorded materials, such as pre-recorded material from the host computer 18, a DVD, CD-ROM, Tape, etc. player, are in constant communication via some type of interface to provide a operator communications link as well as to receive or transmit program instructions. The microprocessor may also operate in stand alone mode in some applications, and a host computer, DVD, CD-ROM, tape, etc. player is Only used for initial program input.

To determine system tactile feedback, at first the programmable regulator 32 sets the value of the voltage or current to be supplied to the memory, which generates a particular torque or resistance. Then the value of acceleration produced in the output shaft of the motor, differential, clutch and/or break is calculated (based upon data from the displacement encoder unit 20, 20b and encoder unit 20c), the microprocessor 28 determines the exact value of the resisting/guiding force of rotation of the output shaft. Setting a preselected value of torque or resistance generated by the motor, differential, clutch and/or break using a digital programmable regulator and a microprocessor and then using the change in angular displacement and force magnitude of the motion follow mechanism, motor, differential, clutch and/or break shaft as a function of time to calculate the resisting/guiding torque to the motor, differential, clutch and/or break shaft thus setting force-feedback based on selected forces, is a fundamental function of the system.

Alternatively, to determine system tactile feedback, at first the processor interrogates the magnitude encoder 20c for input magnitude value and the displacement encoder 20, 20b for position data. Then the programmable regulator 32 sets the value of the voltage or current to be supplied to the memory, which generates a particular torque or resistance. Then the value of acceleration produced in the output shaft of the motor, differential, clutch and/or break is calculated (based upon data from the displacement encoder unit 20, 20b and encoder unit 20c), the micro-processor 28 determines the exact value of the resisting/guiding force of rotation at the output shaft. Being able to receive system force information without first setting motor, clutch, break and/or differential torque, is a fundamental function of this system.

There may at least three scenarios in which the system as described in the embodiments in FIGS. 1–10 of this invention could be applied in: 1) Only user position input is relevant and user force input does not effect the system operation, thus the control system outputs a torque pattern that is relative to the user position and does not change if user force input varies. This allows he control system to create torque patterns according to visual, audio or any other suited sensory medium. 2) User force and/or biofeedback, and position input are booth relevant, thus the system is able to calibrate and measure user force and/or biofeedback and system forces. This allows for accurate user position and force and/or biofeedback measurement. 3) User force and/or biofeedback and position input are booth relevant and the control system creates torque information according to a particular software application. The system constantly adjusts torque according to user position and force and/or biofeedback information in relationship to for example an objects position and force (density, friction, mass, etc.) information that is displayed on the computer screen.

To perform all these functions it is fundamental that the microprocessor 28 receives the information by the encoder direction data unit 21 and/or the displacement encoder unit 20, 20b and/or the input encoder unit 20c.

Figure 7:
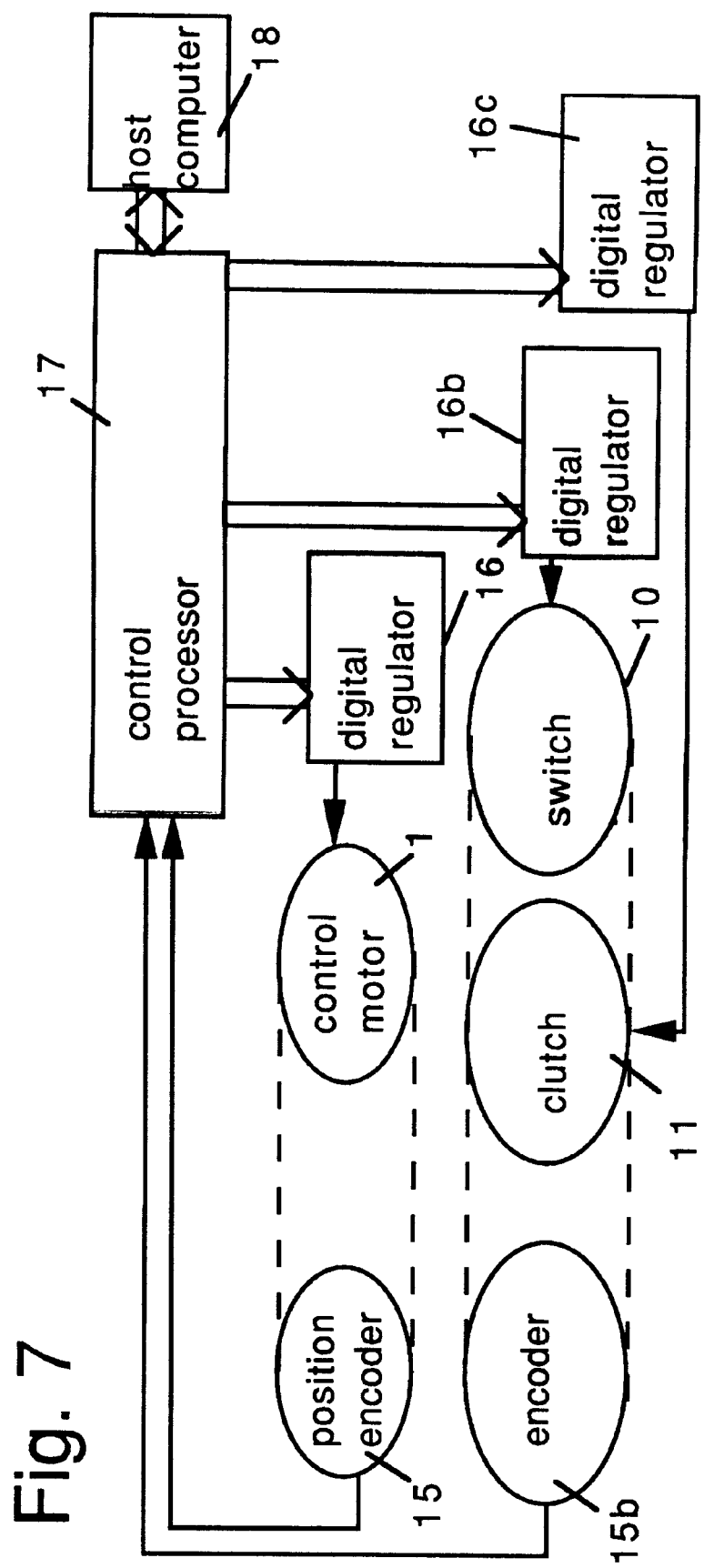
FIG. 7 Here is shown a block diagram of a system combining a clutch mechanism with a motor.

FIG. 7 Here is shown a block diagram of a system different then the system of FIG. 5 in that that it is a subtractive system constructed in accordance with the teachings of the present invention. The system includes at first a motor/encoder assembly 1/15 comprising a motor 1 and a encoder 15 supplying the system with a stable and rudimentary force. A multiple position switch comprising of a switch mechanism 10 is included, controlling the directional change in rotation and the time value of contact at each particular position. A clutch device/encoder assembly 11/15b is included as well, comprising a generator driving the clutch mechanism 11 such as to supply with a smooth variety of guiding force value, by constantly adjusting the guiding force a user limb operatively is exposed to and an encoder 15b which monitors the angular position of the clutch shaft. The motor shaft 1 is connected to the force mechanism controlled by a switch 10. The switch shaft 10 is connected to the clutch mechanism which is operatively connected to the motion follow mechanism and provides a force of resistance for the user to develop force feedback indicative to the level of selected forces developed while operating the motion follow mechanism. The motor 1 is connected to a digital regulator 16. This regulator has the ability of either setting a precise value of voltage or current to the motor. The switch mechanism 10 is connected to a digital regulator 16b. This regulator has the ability of either setting a precise value of voltage or current to the switch. The clutch device 11 is connected to a digital regulator 16c. This regulator has the ability of either setting a precise value of voltage or current to the clutch. In this embodiment the motor 1 is programmed to maintain a particular speed and force. Using this constant speed and force as raw material the switch mechanism 10 alters calculated value, changing the direction of rotation at the switch shaft and calculates the time value of contact at particular switch position, thus altering the guiding force of the switch shaft. When ever the switch mechanism 10 is positioned at one of the shaft rotation positions 2/2b, the clutch mechanism 11 may engage, subtracting calculated force value, at that point controlling the guiding force of the clutch shaft. The digital regulator 16 may balance the speed and force of the motor 1 every time the switch mechanism 10 changes its position or the clutch mechanism changes its force value. Further on the switch mechanism 10 and its digital regulator 16b may change its position, the clutch mechanism and its digital regulator 16c may change its force value and the motor 1 and its digital regulator 16 may being balanced/changed if the user limb force changes its value. Thus maintaining complete control over the speed, direction of force and magnitude of force developed by the user through the motion follow mechanism. The output from the shaft position encoders 15 and 15b is connected to the same or a different decoding logic. The decoding logic output then goes to the processor 17. For storage of programming and data, as used in the operation of the processor 17, the processor 17 may be connected to a host computer 18. The processor 17 is connected to and digitally controls the programmable regulators 16, 16b and 16c as to precisely regulate the polarity, current or voltage and thereby the: a) torque supplied to the motor 1, b) the contact time value at each particular position of the switch 11, c) the switch position, thus the direction of rotation and force of the shaft by the switch. d) the force deductive value of the clutch mechanism 11 thus the guiding force of the clutch shaft. e) a combination of the above.

The system of the present invention comprises at least one motor 1 including a position encoder 15. For each additional shaft the system also includes at least: one switch 10, and at least one clutch 11 with a shaft position encoder 15b. The shaft 15/15b encoder blocks are connected to the processor 17. Each encoder block is periodically selected and interrogated for position information. Separate counter and direction encoder circuitry are included at each encoder block, thus monitoring respective direction of rotation, and angular position of the clutch and motor shaft. A common bus connects the processor 17 to the digitally controlled regulators 16a, 16b and 16c. And the respective regulators 16a, 16b and 16c are being adjusted by the microprocessor 17 such that the clutch shaft 11 is driven to the particular position according to the information of shaft position encoders 15/15b such that system operation supplies the user with the needed force feedback. The feedback force developed by motor 1 is maintained precisely by the regulator 16, the value that determines switch position is adjusted by regulator 16b, and the value that determines force dictation developed by the clutch is adjusted by regulator 16c.

The motor 1 is connected by mechanical means to the switch mechanism 10. The switch 10 which may or may not be located near the motor 1 is operatively connected to the motor on one end and to the clutch mechanism on the other end. The clutch 11 which may or may not be located near the motor 1, or switch 10 is operatively connected to the switch on one end and to the motion follow mechanism on the other end. These physical connections may vary depending upon the particular application, such that the user can hand rotate the shaft (not shown) and feel the feedback as the processor of the motion follow mechanism is being in effect.

A digital word may be fed to the regulator 16, 16b, and 16c by the processor 17 in some cases, thus producing an exact ratio between the force/speed of the motor 1 and the force-alteration of the switch 10 and clutch 11. Usually the force of the motor 1 will be varied as a function of system forces, switch and clutch interaction and a selected blend of these forces. These variations are being controlled by the processor 17 achieving, continuos system force feedback at the shaft shaft (not shown), and thereby to the user. On a precisely timed, periodic basis, the processor 17 reads the shaft position information from the encoders 15 and 15b and each value is compared. If there is any significant difference between the previous and new values the micro processor outputs a signal to the motor 1 of a polarity such that if the switch 10 position and clutch 11 resistance is held stationary the motor will be moved to minimize the position or force error or alternatively, if the motor value is held stationary the switch position and clutch value will be changed to minimize the position or force error. The time and magnitude value of polarity, current or voltage fed to the motor 1, switch 10 and clutch 11 is proportional to the timed error between the previous and new encoders 15/15b count. Compared to the clock cycle of the processor the time interval of the above mentioned process is quite long. And before the time period elapses, the processor determines and sets the position of the motor, switch and clutch shaft before the time period elapses. Usually, in the wait time before this timed event occurs, the processor 17 calculates the system forces developed while operating the system and sets the position of the motor, switch and clutch shaft such that the user feels the selected forces at the shaft (not shown) . The calculation and setting of clutch shaft position takes second priority over user force and host computer information exchange and is interrupted when the time interval flag is set. Thus the user force calculations and host computer information is set every time increment, but more then one time increment is needed to set motor 1 torque, switch 10 position and clutch 11 value. Compared to a human reaction time the update time of the microprocessor 17, is so frequent that the user feels a virtually continues tactile feedback force applied to the motion follow mechanism by the motor 1, switch 10 and clutch 11 which is directly indicative of the selected forces developed while operating the system.

The physical connection between the motor shaft 1, the switch shaft, the clutch shaft and the motion follow mechanism manipulated by the user, may be the same or may be different or, by implementing various gear trains, they may be generically the same but have different size ratios. The processor 17 is also connected to the host computer 18 (any suitable computer system may be used) which is connected to interface with the processor 17. Position and Force information imparted to or induced by the user and the system usually is also output to the host computer 18.

Each of the memory systems shown in FIG. 7 requires at least one motor and angular position encoder, at least one multiple position switch, at least one clutch and angular position encoder, as well as a digitally programmable regulator. The subsystem may comprise a processor, host computer and other common equipment for each position monitoring medium. Two processors may operate in parallel, such as in applications where very high throughput is needed, one setting user force information, while the other sets motor torque, switch position and clutch force subtraction.

Figure 8:
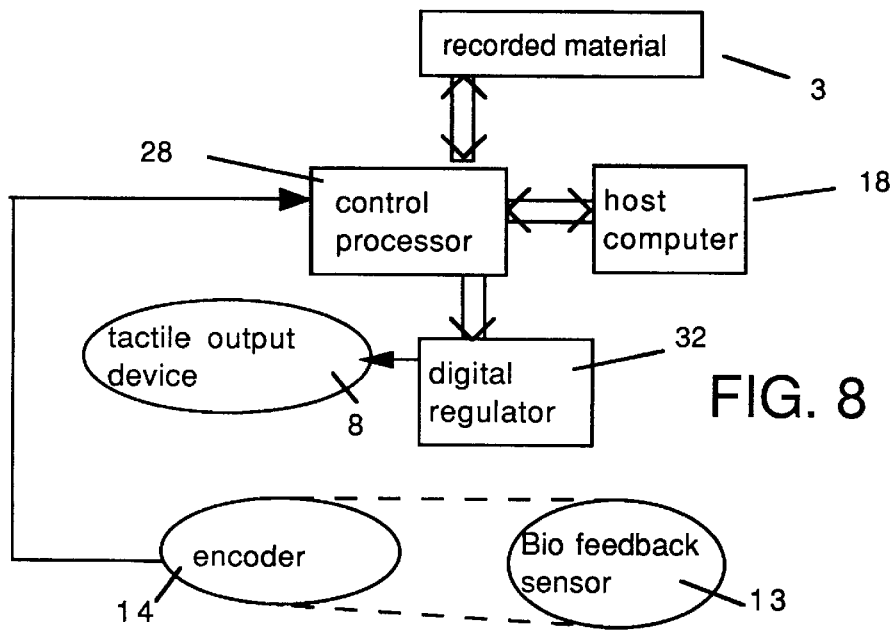
FIG. 8 is shown a block diagram combining a tactile-feedback device with a biofeedback system.

FIG. 8 Here is shown a block diagram of a digital system combining tactile feedback with biofeedback and with pre-recorded playback or live and real-time interactive controllers constructed in accordance with the teachings of the present invention.

This system includes a tactile output device 8 generating the tactile feedback.

This system includes a biofeedback sensor encoder 13/14 collecting data about a wearer of the biofeedback sensor 13.

The tactile output device 8 is connected to a digital four quadrant regulator 32. This regulator has the ability of either setting a precise value of voltage or current to the tactile output device 8 to develop tactile feedback indicative to the level of selected forces developed while operating the system of the present invention.

A processor 28 is also connected to and digitally controls the programmable regulator 32 such that the voltage or current and thereby the pattern supplied to the tactile output device 8 is accurately regulated.

A common bus connects the processor 28 to the digitally controlled regulator 16.

And the respective regulator 32 is being adjusted by the microprocessor 28 such that the tactile output device 8 generates a particular feedback magnitude, frequency, and/or waveform.

The feedback pattern developed by the tactile output device 8 is maintained precisely by the regulator 16.

The regulator 32 and the tactile output device 8 are connected by conducting wire 17c which may vary depending upon the particular application, such that the user can feel the tactile output device 8 feedback, as the processor control of the tactile feedback system is being in effect.

Usually the feedback of tactile output device 8 will be varied as a function of the controller [such as a playback device 3 (not shown), real-time control devices (not shown)], the biofeedback sensor 13, or a selected blend of these including host computer output 18. These variations are being controlled by the processor 28 achieving, for human sensors, continues system feedback to the tactile output device 8 and thereby complete sensory tactile feedback to the user.

The calculation and setting of the tactile output device 8 feedback takes second priority over the play-back controller 3, real-time controller 3, the biofeedback sensor 13 input, and other host computer information and is interrupted when the time interval flag is set. Thus the tactile output device 8 feedback takes second priority over the play-back controller 3, real-time controller 3, the biofeedback sensor 13 input, and other host computer information are set every time increment, but more then one time increment is needed to set tactile output device 8 torque and the tactile output device 8 feedback. Compared to a human reaction time the update time of the microprocessor 28, is so frequent that the user feels a virtually continues tactile feedback applied to the material 4 by the tactile output device 8 which is directly indicative of the selected forces developed while operating the system.

The processor 28 is connected to the host computer 18 (any suitable computer system may be used) which is connected to interface with the processor 28. The system of the present invention is particularly adapted for combining tactile feedback and biofeedback with visual and audio feedback.

Each of the memory systems shown in FIG. 8 requires a tactile output device 8, biofeedback sensor 13, as well as a digitally programmable four quadrant regulator. Such a tactile feedback assembly is shown in FIG. 8.

The subsystem may comprise a processor, host computer and other common equipment for each force generation medium. Two processors may operate in parallel, such as in applications where very high throughput is needed, one setting control signals pre-recorded information player, biofeedback sensor 13, and other host information, while the other sets tactile output device patterns.

Although the previously described system in FIG. 8 is illustrated as being in a single plane of motion or feedback, it should clearly understood that with proper gimballing and multiple tactile feedback generation medium and processor units, multiple planes of feedback and biofeedback input are readily configured using combinations and multiples of the system described in FIG. 8.

Figure 9:
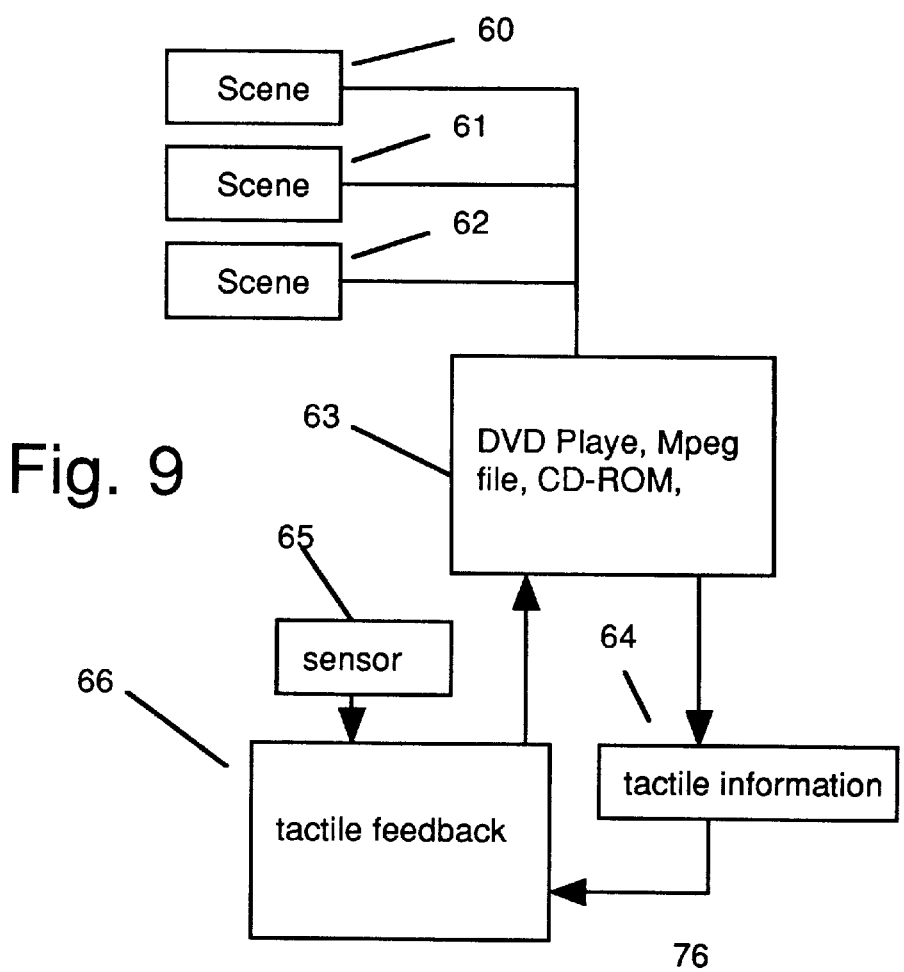
FIG. 9 is shown a block diagram using pre-recorded material to supply with a variety of scenarios in response to the interactive input.

FIG. 9 Here is shown a block diagram of pre-recorded material interacting with sensor information and tactile output devices being constructed in accordance with the teachings of the present invention.

The system includes a first pre-recorded material located at a DVD, CD-ROM, Tape, etc. (comprising of any currently available playback device) which controls the system.

Sensor information 65 is included which communicates information about a biofeedback system and/or positional/ force information of a Tactile output device 66 to the playback device.

Also tactile feedback information 64 is included in the playback device 63 which controls the tactile/force-feedback device 66.

Pre-recorded material located at the playback device 63 can comprise of multiple scenes 60, 61, and 62 such that according to the sensor 65 information a particular scene, clip, sequence, etc. is selected. This provides with interactive communication between a tactile/force-feedback device 66, sensor 65 input and pre-recorded data.

Figure 10:
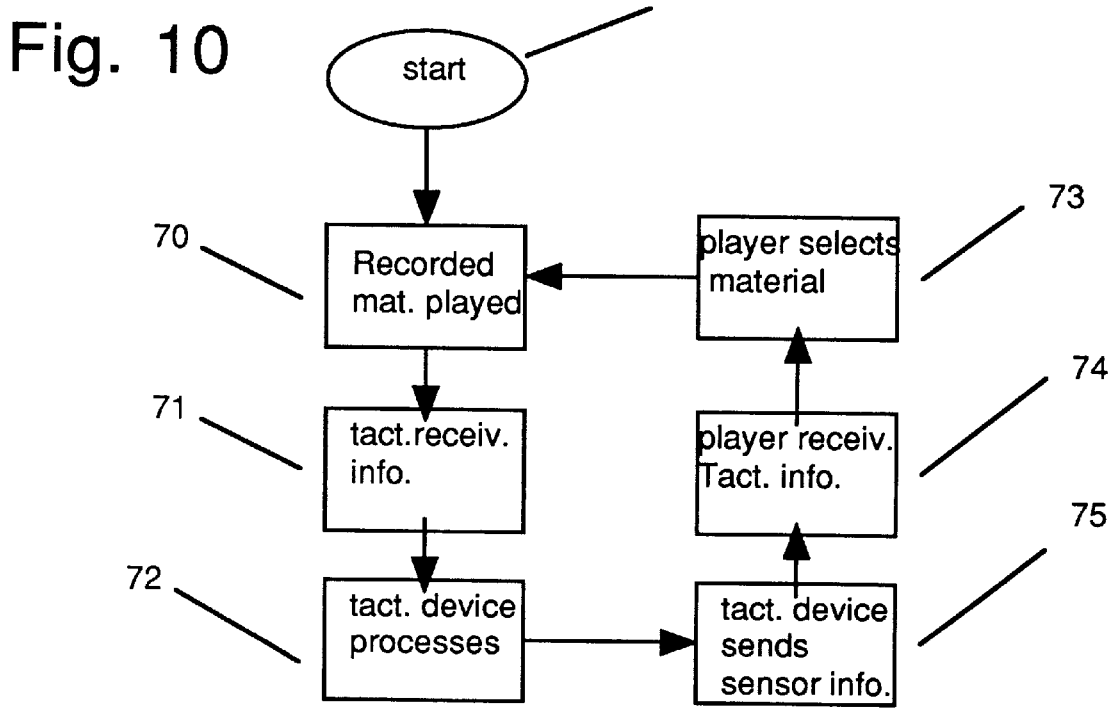
FIG. 10 is shown a flow chart illustrating how pre-recorded material supplies a tactile feedback device with a variety of scenarios in response to sensor input.

FIG. 10 Here is shown a flow chart of pre-recorded material interacting with sensor information and tactile output devices being constructed in accordance with the teachings of the present invention.

At the start 76 the recorded material is played 70. A file containing the tactile information transmits its contents together with other information such as video and/or audio format such as MPEG to the tactile feedback device. The tactile feedback device receives 71 the recorded material and processes 72 the tactile information. Then information 75 coming from sensors that are connected to the tactile output device (not shown) is transmitted to and received 74 by the player. According to the sensor information 75, the playback device selects 73 particular material. The player plays back 70 the selected material repeating the process as defined in FIG. 10 until the link between the two devices is interrupted or until the One or booth devices are turned off.

Figure 11:
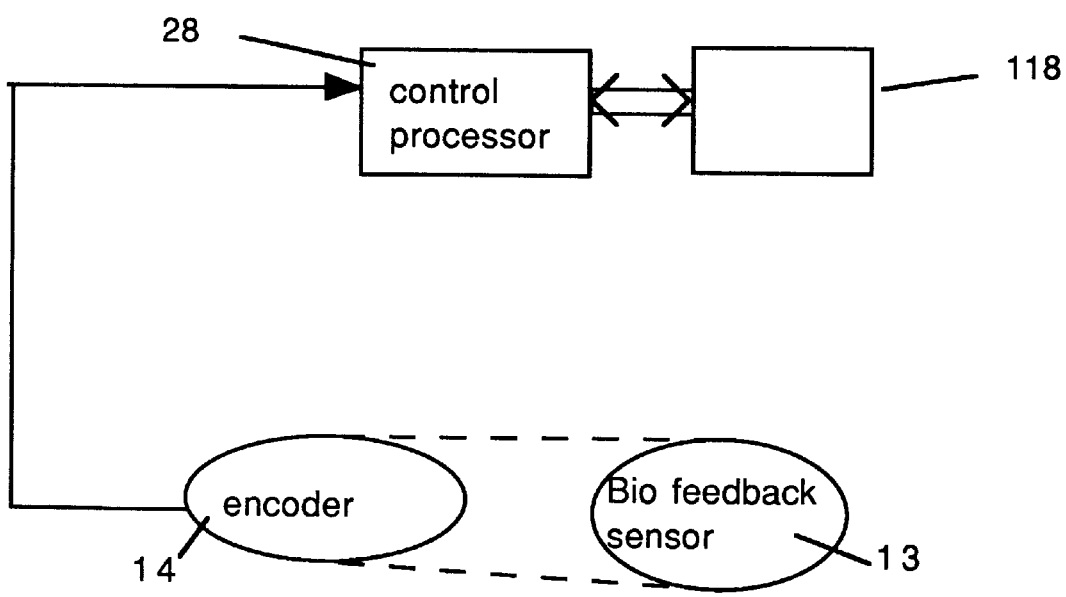
FIG. 11 Here is shown a block diagram of a digital system using biofeedback sensors to select pre-recorded material.

FIG. 11 Here is shown a block diagram of a digital system using biofeedback sensors to select pre-recorded material constructed in accordance with the teachings of the present invention.

This system includes a biofeedback sensor encoder 13/14 collecting data about a wearer of the biofeedback sensor 13.

The system also includes a processor 28 which converts the sensor 13 data and sends this data to playback device 118.

Usually the feedback of playback device will be varied as a function of the processor calculations according to data coming from the biofeedback sensor 13. This feedback is being controlled by the processor 28 achieving, for human sensors, continuos system feedback (visual or audio) and thereby complete sensory video feedback to the user.

The processor 28 is connected to the playback device 118 (any suitable playback may be used).

The system of the present invention is particularly adapted for combining biofeedback with visual and audio feedback.

The subsystem may comprise a processor, playback device and other common equipment for each biofeedback video interaction medium.

Conclusions, Ramifications, and Scope

Accordingly it can be seen that a highly flexible and interactive system has been created allowing users to interact with each other through tactile feedback and by using their computers at home. Also, it can be seen that aesthetically shaped, and more important, Dermatologically compatible devices can be created, that include tactile functionality and interactivity.

Although the description above contains specificity's, these should not be construed as limiting the scope of the invention but as merely providing examples of some of the preferred embodiments of this invention. Various other embodiments and ramifications are possible within its scope.

For example, in some instances the tactile feedback device may use temperature feedback, vibrational feedback, or any other suited non-force feedback means to interact with this system.

Alternatively, in some instances the artificial limb device may use robotic devices, hydraulic feedback, suction devices, or any other suited feedback means to interact with this system. Any means of stimulating the tactile sensory system of a living being can be integrated into this system. For example, devices used extensively in the sex industry such as vibrators, masturbaters, dildos, even whole dolls, etc., or devices used in the game industry such as joy-sticks illustrate best the variety of tactile interactive devices that can be used with this system.

Material 50 can be used to seal the tactile feedback device airtight and also to create a portable device that contains such a tactile feedback device. The artificial limb may look like a human limb or it may resemble any other form such as to serve a particular tactile functionality, therefor, not just aesthetically shaped, but more important, physically and Dermatologically compatible devices can be created, that include specific tactile functionality's and interactivity's.

Communication means other than a personal computer or DVD player can be used for communication, such as broadcasting, or any other suitable medium. Also, all components of this system such as computing means, playback device, force-feedback means, tactile output means, and biofeedback means may not be physically connected, but implement a wire less communication system. Force-feedback means, and tactile output means may be connected directly without using a host computer.

Booth force-feedback means and tactile-feedback means may be implemented in the system of the present invention.

Force-feedback systems other then described in FIG. 5 such as a subtractive Force-feedback systems described in FIG. 7 may be used.

Devices 4 described as a artificial limb may be replaced by another force-feedback device as described as device 5. Or alternatively, devices 5 described as a force-feedback device may be replaced by another artificial limb as described as device 4.

A force-feedback device 5 may comprise of a simple one degree of freedom dial, a joy-stick, or any other suitable force-feedback device.

Sensors as described as sensors 15 and 13 may comprise of rotary position encoders, pressure sensors, temperature sensors, etc. Also, these sensors as described as sensors 15 may be part of the position controlling device, or they may be located at material 50, or they may be part of material 50 such as FSR sensor material as used by Simmons in their vibraphone musical instrument.

In some instances the material 50 that encases the tactile output device could comprise of silicon, rubber, plastic, skin imitations as used in current adult toys, etc.

The embodiments of the system of the present invention can be combined such as, for example, the system of the present invention can be linked to the Internet through a computer or through television communications and the user can talk with each other over the phone system.

Thus the scope of the invention should be determined by the appended claims and their legal equivalents, rather then by the example given.

What is claimed is:

1. A system for controlling tactile stimulation of a user including:
    a force-feedback means as to apply force to a user to stimulate the tactile sensory system of said user;
    said tactile stimulation means contains sensing means to provide with information about the magnitude of said tactile stimulation means;
    a material means encloses said tactile stimulation means;
    and said material means is capable to translate said tactile stimulation;;
    and said material means forms a seal, preventing outside liquid from coming in contact with said tactile stimulation means;
    a regulating means, and said regulating means translates an input signal coming from a controlling means into an understandable output signal for said tactile output means;
    a controlling means, and said controlling means originates said signal that is send to said tactile output means;
    and computing means operatively connected to said force-feedback means for providing a user interactive platform.

2. A controlling system as set forth in claim 1, wherein said force feedback means comprises of robotic means.

3. A controlling system as set forth in claim 1, wherein said force feedback means comprises of hydraulic means.

4. A controlling system as set forth in claim 1, wherein said force feedback means includes a vibration means.

5. A controlling system as set forth in claim 1, wherein said controlling means comprises of at least two computing means that are connected.

6. A controlling system as set forth in claim 1, wherein said controlling means comprises of at least two computing means that are connected and communicate via a web-browser means.

7. A controlling system as set forth in claim 1, wherein said controlling means includes of CD-ROM means.

8. A controlling system as set forth in claim 1, wherein said controlling means includes of DVD means.

9. A controlling system as set forth in claim 1, wherein said tactile stimulation means is portable and can be handled with one hand.

10. A controlling system as set forth in claim 1, wherein said tactile stimulation means is wireless.

11. A controlling system as set forth in claim 1, wherein said sensing means is a bio-feedback sensing means collecting information about the state of being of a human.

12. A controlling system as set forth in claim 1, wherein said sensing means is a motion sensing means collecting information about the movement of said force-feedback means.

13. A system for controlling tactile stimulation of a user including:
    a force-feedback means as to apply force to a user to stimulate the tactile sensory system of said user;
    said tactile stimulation means contains sensing means to provide with information about the magnitude of said tactile stimulation means;
    a regulating means, and said regulating means translates an input signal coming from a controlling means into an understandable output signal for said tactile output means;
    a controlling means, and said controlling means originates said signal that is send to said tactile output means;
    and said controlling means operatively connected to said force-feedback means is providing a signal through per-recorded medium means.

14. A controlling system as set forth in claim 13, wherein said material means is a material means that encloses said tactile stimulation means;
    and said material means is capable to translate said tactile stimulation.

15. A controlling system as set forth in claim 13, wherein said material means is a material means that encloses said tactile stimulation means;
    and said material means forms a seal preventing liquid from penetrating past the material means.

16. A controlling system as set forth in claim 13, wherein said controlling means comprises of CD-ROM means.

17. A controlling system as set forth in claim 13, wherein said controlling means comprises of DVD means.

18. A controlling system as set forth in claim 13, wherein said sensing means is a bio-feedback sensing means collecting information about the state of being of a human.

19. A controlling system as set forth in claim 13, wherein said sensing means is a motion sensing means collecting information about the movement of said force-feedback means.

20. A system for controlling tactile stimulation of a user including:

- a force-feedback means as to apply force to a user to stimulate the tactile sensory system of said user;
- a bio-feedback sensing means that monitors the user and provides the control system with user status;
- a regulating means, and said regulating means translates an input signal coming from a controlling means into an understandable output signal for said tactile output means;
- a controlling means, and said controlling means originates said signal that is send to said tactile output means.

* * * * *